(12) United States Patent
Adachi

(10) Patent No.: US 6,537,055 B2
(45) Date of Patent: Mar. 25, 2003

(54) REMOVING APPARATUS FOR MOLDED PRODUCTS

(75) Inventor: Isao Adachi, Nagoya (JP)

(73) Assignee: Star Seiki Co, Ltd., Nagoya (JP)

( * ) Notice: Subject to any disclaimer, the term of this patent is extended or adjusted under 35 U.S.C. 154(b) by 138 days.

(21) Appl. No.: 09/848,045

(22) Filed: May 3, 2001

(65) Prior Publication Data

US 2002/0105104 A1 Aug. 8, 2002

(30) Foreign Application Priority Data

Feb. 8, 2001 (JP) ........................................ 2001/031878

(51) Int. Cl.⁷ .............................................. B29C 45/40
(52) U.S. Cl. ........................ 425/315; 264/334; 425/556
(58) Field of Search .................... 425/436 R, 436 RM, 425/444, 556, 308, 315; 264/334

(56) References Cited

U.S. PATENT DOCUMENTS

| | | | | |
|---|---|---|---|---|
| 4,204,824 A | * | 5/1980 | Paradis | 425/444 |
| 5,518,387 A | * | 5/1996 | Di Simone | 425/556 |
| 5,629,031 A | * | 5/1997 | Ishikawa et al. | 425/556 |
| 6,372,171 B1 | * | 4/2002 | Sorensen et al. | 425/444 |
| 6,409,945 B1 | * | 6/2002 | Yamamoto | 425/556 |

* cited by examiner

*Primary Examiner*—Tim Heitbrink
(74) *Attorney, Agent, or Firm*—Frishauf, Holtz, Goodman & Chick, P.C.

(57) ABSTRACT

The invention provides a removing apparatus for molded products and a method for cutting off gates of molded products, by which various types of molded products having different gate positions from each other are cut off to separate the product parts from runners with high accuracy by using a single cutting member and which contributes to downsizing of the apparatus itself. The invention further provides a removing apparatus for molded products and a method for cutting off gates of molded products, by which work for attaching the cutting unit is simplified and work for removing is made very efficient. In addition, the invention provides a removing apparatus for molded products and a method for cutting off gates of molded products, in which gates of various types of molded parts are cut off and separated from product parts by a single cutting member, wherein a chuck unit, which has a plurality of product parts at a runner and holds molded products, is controlled and moved between a metal mold position of a molding machine and a release position outside the metal mold in order to pick up molded products, a cutting unit having a cutting member that cuts off the gates of molded products by opening and closing a pair of cutting blades is provided at the release position side, and the cutting member is controlled and turned by an electric motor to cause the blades to be positioned at the gate position of respective product parts in the molded products held by the chuck unit for cutting off and separation.

3 Claims, 6 Drawing Sheets

REMOVING APPARATUS FOR MOLDED PRODUCTS

DETAILED DESCRIPTION OF THE INVENTION

1. Technical Field of the Invention

The present invention relates to an removing apparatus for molded products and a method for cutting off gate of molded products, which is provided with a gate cutting feature and by which molded products taken out from a molding machine are removing and product parts and their runner are cut off and separated from each other in a removing cycle.

2. Prior art

Conventionally, molded products are cut off to separate product parts from runners by a cutting unit arrayed so that cutting members whose quantity is coincident with the number of product parts of the molded products are positioned at the gate position, which is the boundary between the product parts of the molded products and the runner (sprue part), at the side of the release position of the molded products at the machine frame of a removing apparatus. However, by controlling and moving the chuck unit that holds molded products taken out between metal molds of a molding machine, it is necessary to control and move the gates of the molded products with high accuracy so that the gates can be positioned between opened blade members, wherein the position control is complicated and cumbersome, and it is necessary to position the cutting unit with high accuracy so that the blade members of respective cutting members, face respective gates of the molded products when attaching the cutting unit to the apparatus frame, wherein work efficiency is worsened.

Also, in a prior art cutting unit, it was necessary to manufacture the cutting members, whose quantity is responsive to the size of molded products, quantity of the product parts, and respective gate positions, so that they can be arrayed and positioned at the respective gate positions. Therefore, where molded products having different gate positions are cut off, the attaching position of the cutting members is changed so that they can be coincident with the respective gate positions, or it was necessary to manufacture in advance cutting units in which the cutting members are disposed so that they are coincident with the respective gate positions.

Therefore, there were some problems in that, in the case where the array of the cutting members is changed, work for changing the position thereof is cumbersome, and in the case where a plurality of types of cutting units are manufactured in advance, parts cost of the cutting units may be increased.

Further, in the abovementioned cutting unit, since a number of cutting members that are coincident with the quantity of the product parts are required, the number of parts of the cutting unit itself is increased, resulting in an increase in cost.

SUMMARY OF THE INVENTION

The present invention was developed in order to solve the problems and shortcomings in the abovementioned prior art. It is therefore an object of the invention to provide a removing apparatus for molded products and a method for cutting off gates of molded products, by which various types of molded parts having different gate positions from each other are cut off to separate the product parts from runners with high accuracy by using a single cutting member and which contributes to downsizing of the apparatus itself.

It is another object of the invention to provide a removing apparatus for molded products and a method for cutting off gates of molded products, by which work for attaching the cutting unit is simplified and work for picking up is made very efficient.

It is still another object of the invention to provide a removing apparatus for molded products and a method for cutting off gates of molded products, in which gates of various types of molded parts are cut off and separated from product parts by the least number of cutting members.

DESCRIPTION OF AN EMBODIMENT OF THE INVENTION

Hereinafter, a description is given of the embodiment of the invention with reference to the accompanying drawings.

Figure 1:
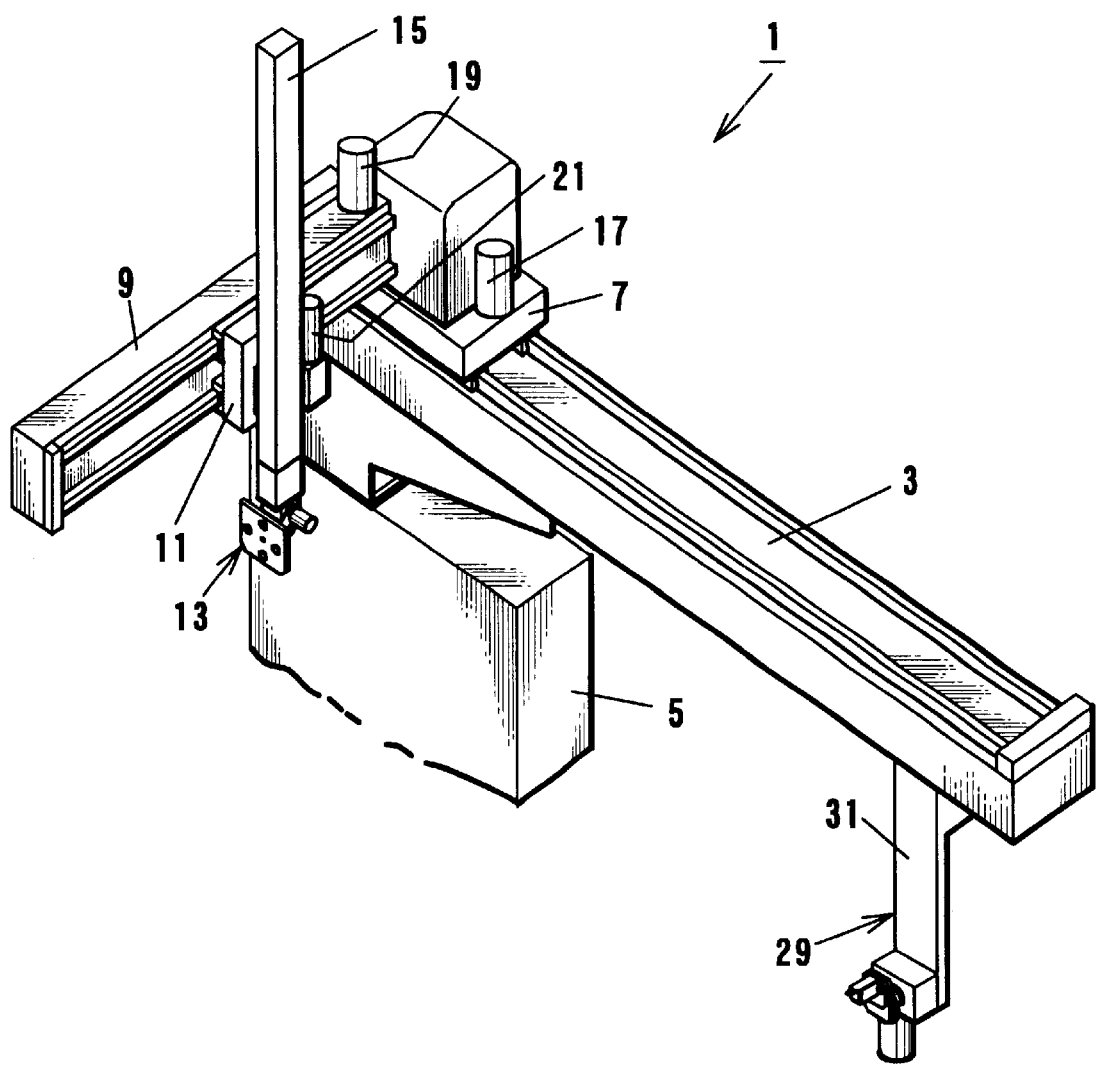
FIG. 1 is a general perspective view of a removing apparatus for molded products.
Figure 2:
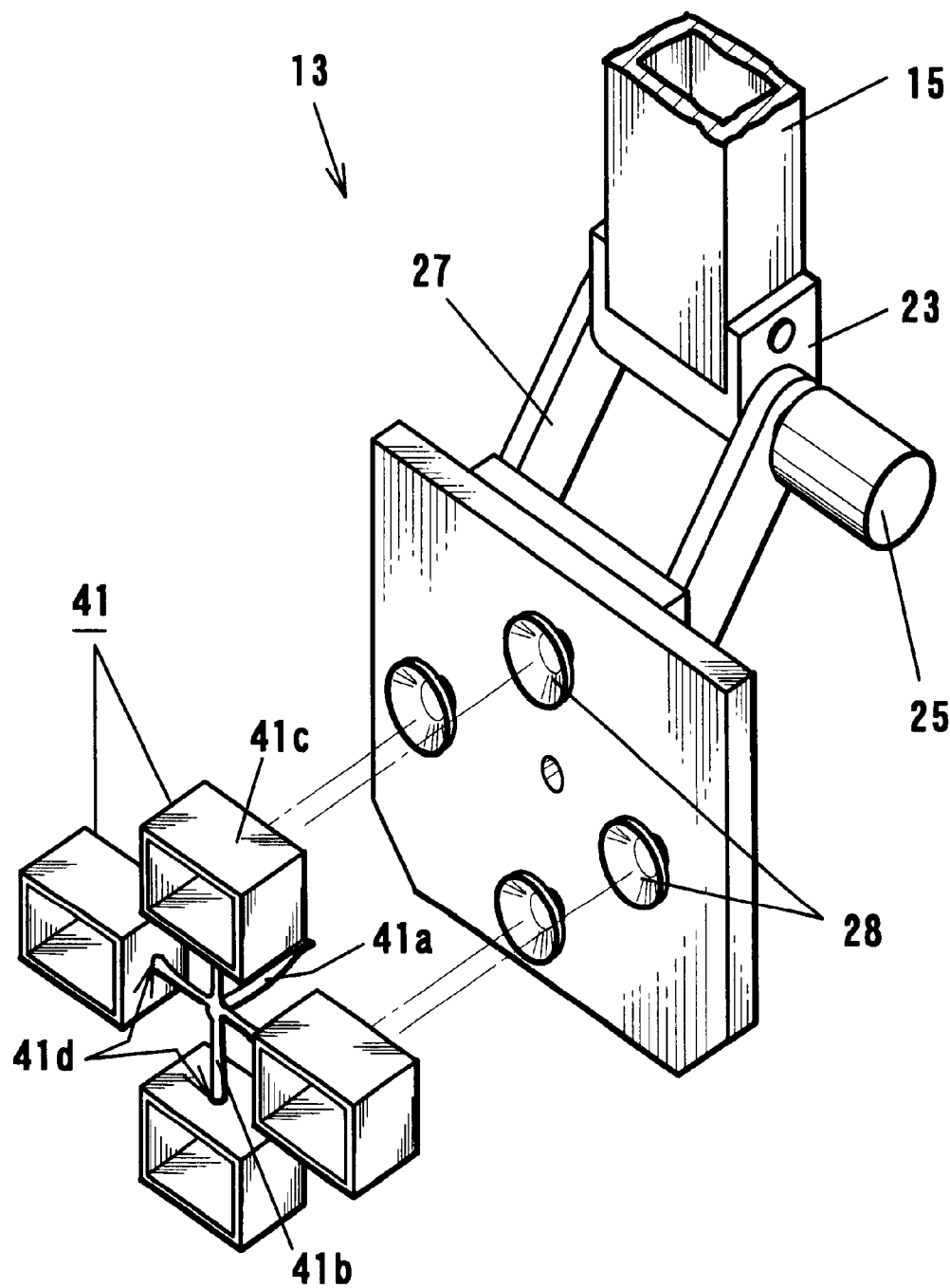
FIG. 2 is a partially perspective view of a chuck unit.
Figure 3:
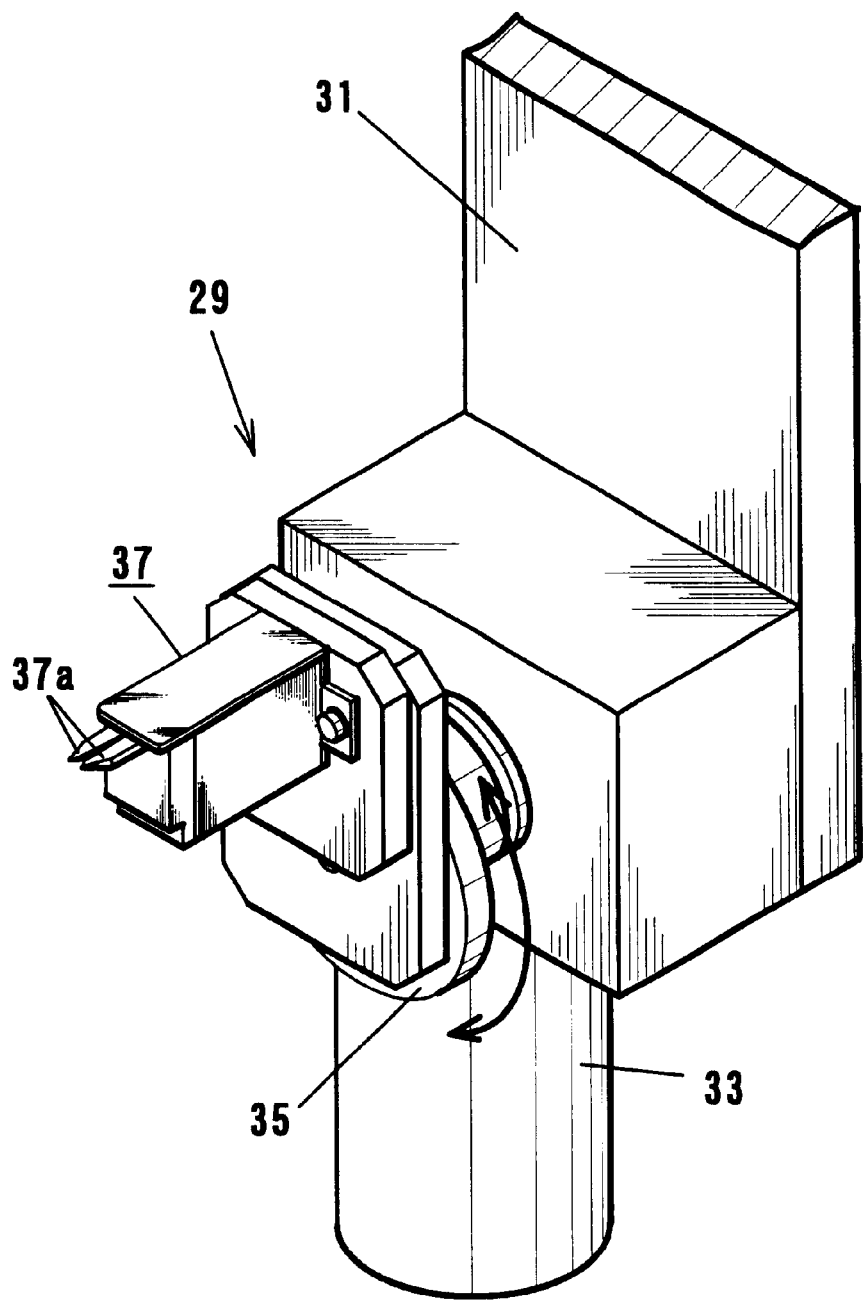
FIG. 3 is a partially perspective view of a cutting unit.

In FIG. 1 through FIG. 3, the main frame 3 of the removing apparatus 1 is fixed on the upper part of an attaching base 5 at the fixing side of a molding machine, and has such a length extending in the direction (the right and left direction) orthogonal to the axial direction of an extruder and reaching above a metal mold and the release position at the rear side or the front side of the molding machine. A carriage 7 is supported on the main frame 3 so that it can travel in the right and left directions.

A forward and rearward frame 9 extending in the axial direction (the forward and rearward directions) of the molding machine is provided on the carriage 7, and a forward and rearward carriage 11 is supported on the forward and rearward frame 9 so that it can move forward and rearward. A vertical frame 15 to which a chuck unit 13 is attached is supported at the lower part of the forward and rearward carriage 11 so that the vertical frame 15 can elevate and descend.

The carriage 7, forward and rearward carriage 11 and vertical frame 15 are driven and controlled by the first through third servo motors 17, 19 and 21 that are numerically controllable, wherein the chuck unit 13 is controlled to move in the three-dimensional directions of the right and left direction, forward and rearward direction, and up and down direction, thereby removing molded products.

The first through third servo motors 17, 19 and 21 are provided with a position detecting member (not shown) such as, for example, a rotary encoder, and the moving distance (movement position) and moving speed of the chuck unit 13 are detected by position detecting signals outputted from respective position detecting members in line with drive of the first through third servo motors 17, 19 and 21, whereby the chuck unit 13 is controlled to move in a closed loop.

The chuck unit 13 is composed of a servo motor 25 for a chuck that is attached to a holder 23 fixed at the lower part of the vertical frame 15, an attaching plate 27 fixed on a rotating shaft of the servo motor 25 for the corresponding chuck, and a chucking member 28 that is secured at the corresponding attaching plate 27 and consists of a plurality of sucker members for holding molded products and an air cylinder, etc. The attaching plate 27 reciprocates and turns over by 180 degrees between the lower position and the upper position centering around the rotating shaft in line with drive of the servo motor 25 for the chuck.

Also, a rotating angle detecting member (not shown) such as a rotary encoder, etc., which is to detect the rotating angle of the attaching plate 27 is mounted on the servo motor 25 for chuck, and the servo motor 25 for chuck is driven and controlled on the basis of a detection signal from the corresponding rotating angle detecting member. Also, a link mechanism that is connected to a cylinder, or an air motor, etc., may be used in addition to the above mentioned servo-motor 25 for chuck as a member for turning over and rotating the attaching plate 27.

A cutting unit 29 is provided at the side of the release position of the main frame 3. The corresponding cutting unit 29 is composed of a nipper attaching plate 31 fixed at the main frame 3, a nipper servo motor 33 attached to the corresponding nipper attaching plate 31, and a cutting member 37 such as an air nipper, etc., that is secured at the rotating plate 35 attached to the rotating shaft of the corresponding nipper servo motor 33. The corresponding cutting member 37 is of, for example, an air cylinder type, and opens and close a pair of cutting blades 37a by reciprocal movement of a piston by compressed air.

Also, a member (not shown) for detecting a rotating angle such as, for example, a rotary encoder, which detects a rotating angle of the rotating plate 35, is attached to the nipper servo-motor 33. In addition, the rotating shaft of the nipper servo motor 33 is coupled to the rotating plate 35 via, for example, a worm mechanism (not shown), and rotates the rotating plate 35 at an appointed ratio of speed reduction with respect to the rotations of the nipper servo motor 33.

Next, a description is given of a gate processing operation of molded products by a removing apparatus for molded products constructed as described above. For the convenience of description, it is assumed that a molded product 41 has a product part 41c at the tip ends of a plurality of sprue parts 41b that extend in the radial direction at one end of the runner 41a, and has a gate 41d at the boundary between the sprue part 41b and the product part 41c. Also, the invention is not limited due to the size of molded products and profiles thereof, but molded products having various types, sizes and profiles can be cut off at the gates, thereby separating the[]product parts 41c from the runners 41a.

First, when a signal to finish the opening of metal molds is inputted from the molding machine into the removing apparatus in a state where the chuck unit 13 is moved to a standby position upward of the metal molds, the third servo motor 21 is driven and controlled to cause the chuck unit 13 to enter between the metal molds. Next, the second servo motor 19 is driven and controlled to cause the chuck unit 13 to face a molded product 41 held in the metal molds. In this state, a protrusion mechanism of the molding machine is driven to cause the molded product 41 to protrude the molded product 41, thereby causing the chuck unit 13 to hold the product part 41c.

Figure 4:
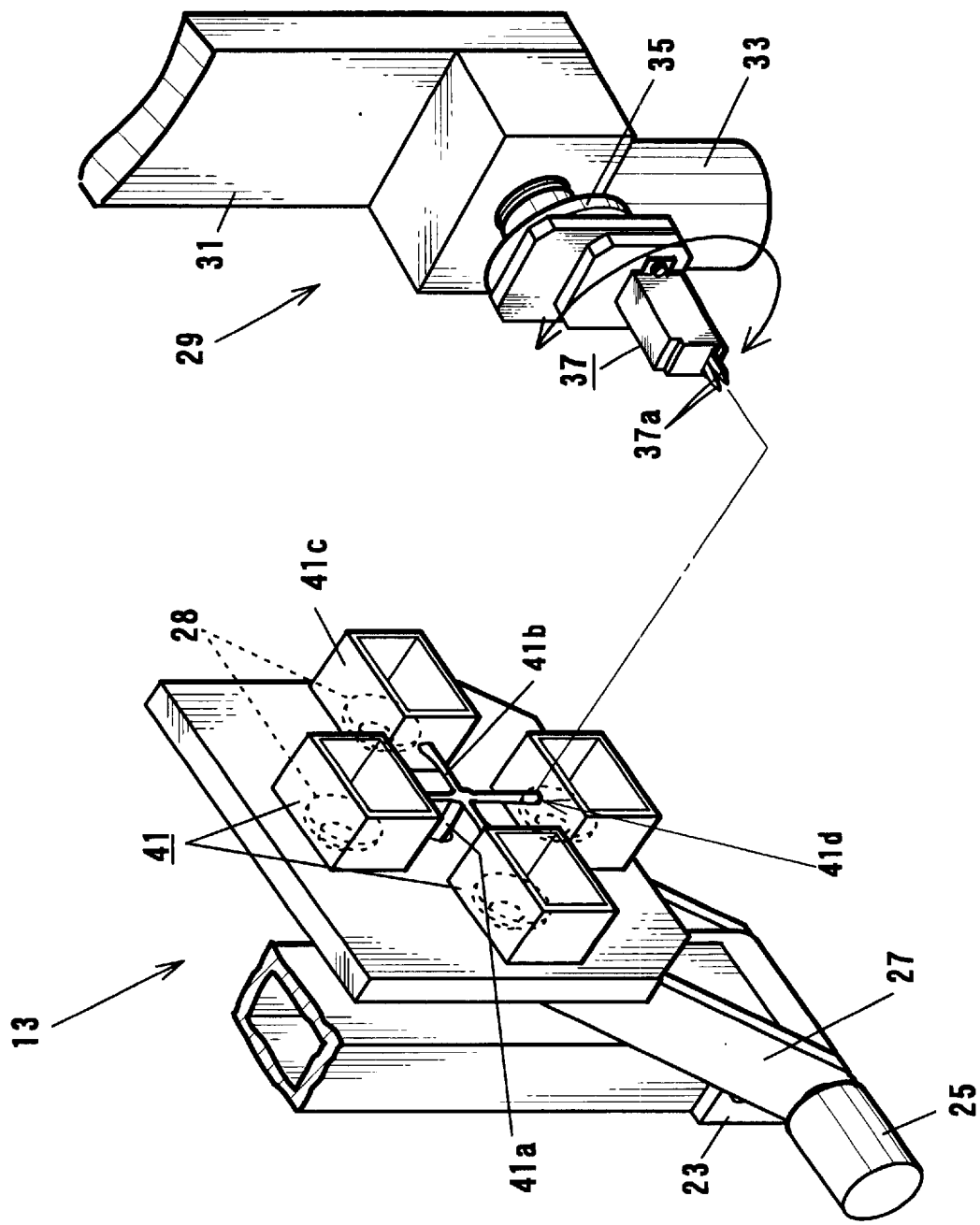
FIG. 4 is an explanatory view showing the relationship between the chuck unit and cutting unit when they are disposed for operation.

Next, after the second and third servo motors 19 and 20 are reversely driven to return the chuck unit 13 to the standby position, the first servo motor 17 is driven and controlled to move the chuck unit 13 to the cutting unit 29 secured at the release position side. At the corresponding position, the chuck servo motor 25 is driven and controlled to turn the attaching plate 27 by 180 degrees, wherein the molded product 41 held by the chuck unit 13 is faced to the cutting unit 29. At this time, the cutting member 37 of the cutting unit 29 is turned to, for example, the lowermost position, and is faced to the product part 41c that is held by the chuck unit 13 and positioned at the lowermost position. (See FIG. 4).

Figure 5:
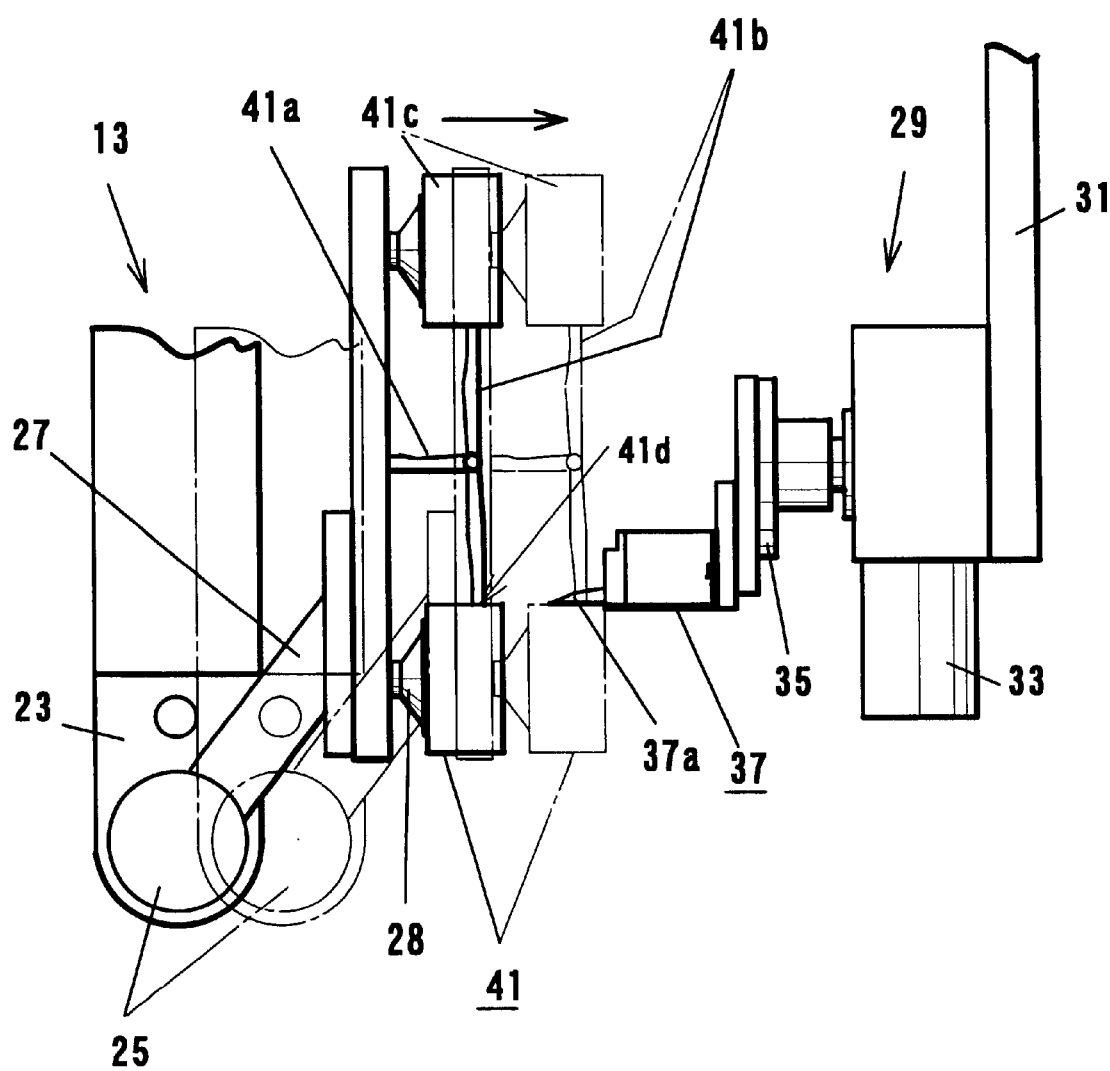
FIG. 5 is an explanatory view showing a cutting operation.

Next, as shown with solid lines in FIG. 5, the first and third servo motors 17 and 21 are, respectively, driven and controlled, whereby the gate 41d located at the boundary between the product part 41c positioned at the lowermost position of the molded product 41 held by the chuck unit 13 and the sprue part 41b is faced and positioned between the opened cutting blades 37a.

Next, as shown with a long-dashed and one-dotted alternate line in FIG. 5, after the second servo motor 19 is driven and controlled to cause the gate 41d to enter between the cutting blades 37a, the cutting blades 37a are actuated and closed, thereby cutting off the gate 41d, and the sprue part 41b is separated from the product part 41c held by the chuck unit 13.

When cutting off the gate part 41d, the third servo-motor 21 is slightly driven to move the chuck unit 13 so that the cutting blades 37a and the product part 41c are pressed to each other, wherein the remaining cuts to the product part 41c are minimized.

Figure 6:
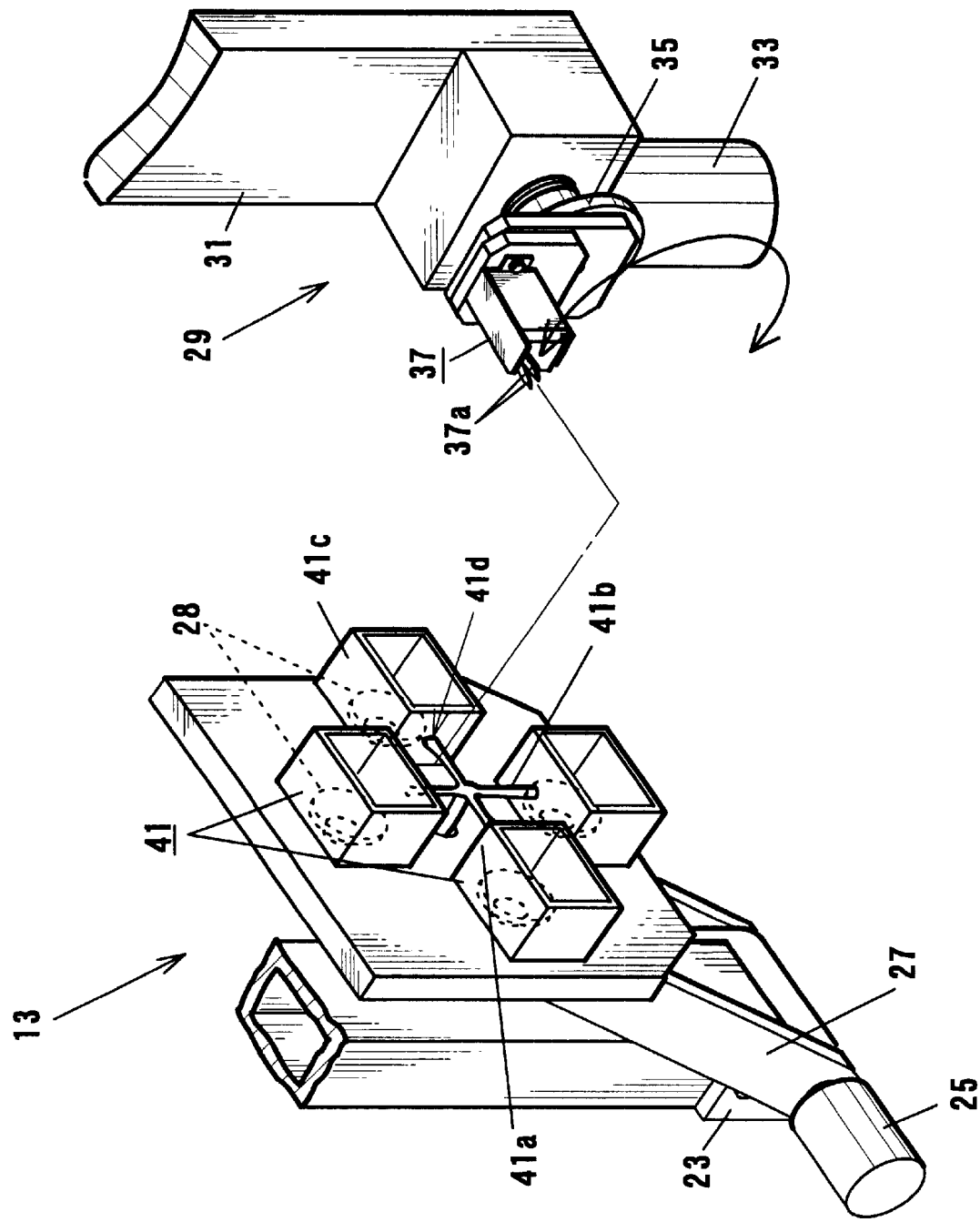
FIG. 6 is an explanatory view showing a cutting operation.

Next, as shown in FIG. 6, after the second servo motor 19 is driven and controlled to space the chuck unit 13 from the cutting unit 29, the nipper servo motor 33 is driven and controlled to turn, for example, the cutting member 37 clockwise by 180 degrees, and to the cutting blades 37a to face the product part 41c located at the uppermost position of the molded product 41.

After the abovementioned motion or simultaneously therewith, the first and third servo motors 17 and 21 are, respectively, driven and controlled to face the gate 41d of the product part 41c positioned at the uppermost position of the molded product 41 to the opened cutting blades 37a. After that, the second servo motor 19 is driven and controlled to cause the corresponding gate 41d to enter between the cutting blades 37a. In the corresponding state, the cutting blades 37a are closed to cut off the gate 41d, thereby cutting off the product part 41c held by the chuck unit 13 and the sprue part 41b.

As in the abovementioned motion, the nipper servo motor 33 is driven and controlled to turn the cutting member 37 by 90 degrees, and the chuck unit 13 is controlled to move, wherein the gates 41d of the respective product parts 41c are faced to the cutting plates 37a by turns. After that, the respective gates 41d are cut off so that the, product parts 41c held by the chuck unit 13 and sprue parts 41b are separated from each other.

The runners 41a including the sprue parts 41b cut off and separated from the product parts 41c drop by their own weight onto a runner-conveying means such as a chute disposed at the site.

After the chuck unit 13 is moved to the product release position by driving and controlling the first servo motor 17 after processing the gates, the product parts 41c are released by the chuck unit 13 at the corresponding position, and are accommodated on the product conveying means such as a transfer conveyor and a container, etc.

In the present embodiment, the cutting member 37 is adequately turned by driving and controlling at least the nipper servo motor 33, wherein the gates can be cut off by facing the cutting member 37 to the gates 41d of the respective product parts 41*c* of the molded product 41. Therefore, although it is not necessary to manufacture a cutting unit to be attached to the cutting member in accordance with the arrayed state of product parts 41*c* per molded product, and to change the arrangement of the cutting member in line with a change in the types of molded products, it is possible to efficiently cut off the gates of molded products.

In particular, by controlling to move the chuck unit 13 in connection with the turning of the cutting member 37, the gates 41*d* of the molded products 41 can be faced to the cutting member 37 with high accuracy, wherein the gates can be accurately cut off.

In the above description, for the convenience, it was assumed that molded products 41 have the product parts 41*c* at the tip end of a plurality of sprue parts 41*b* (four sprue parts in the drawing), which extend in the radial direction at one end of the runner 41*a*. However, by connecting the turning control of the cutting member 37 and movement control of the chuck unit 13, it is possible to very efficiently and accurately cut off the gates of various types and sizes of molded products that have the gates at different positions (angles).

In addition, in the above description, such a structure, in which one cutting member 37 is attached to the nipper attaching plate 31, has been employed. However, for example, two cutting members 37 may be attached to the nipper attaching plate 31 at different attaching angles, and one of the cutting members 37 best suited to the gate position of a molded product is selected by turning, and the gate may be cut off.

Also, the removing apparatus 1 for molded products, which has been described above, has such a structure in which the chuck unit 13 is moved in the three-dimensional directions of right and left, forward and rearward and vertical directions to removing molded products. However, either of the structure in which molded products are removing by moving the chuck unit in at least one of the right/left and forward/rearward directions, or the structure in which molded products are removing by swiveling in the above-mentioned direction may be employed.

As a detailed example of the former structure, a so-called vertical removing structure may be employed, in which the chuck unit 13 is moved forward and rearward between metal molds of a molding machine and between the side end parts in the axial direction of a molding machine.

In the above description, such a structure has been employed, in which the attaching plate in the chuck unit is reversed by the servo motor and is faced to the cutting unit. However, such a structure may be employed, in which the attaching plate may be horizontally turned by a servo-motor, and is faced to the cutting unit.

What is claimed is:

1. A removing apparatus for molded products by controlling and moving a chuck unit, said chuck unit holding a plurality of product parts at a runner between a metal mold position of a molding machine and a release position outside the metal mold, including a cutting-off unit that is disposed at the side of said release position and has a cutting member for cutting off the gates of the molded products by opening and closing a pair of blade members; and a numerically-controlled electric motor for rotating said cutting member in response to the respective gate positions of the molded products; wherein respective product parts are cut off by rotating said cutting member so that it coincides with the respective gates of the molded products held by said chuck unit.

2. The removing apparatus for molded products according to claim 1, wherein movement of said chuck unit is controlled by a servo motor.

3. The removing apparatus for molded products according to claim 2, wherein the gates of the molded products, which are held by said chuck unit, are positioned between said blade members by controlling the movement of the cutting member and controlling the movement of said chuck unit.

* * * * *